US 6,643,058 B2

(12) United States Patent
Pianciola et al.

(10) Patent No.: US 6,643,058 B2
(45) Date of Patent: Nov. 4, 2003

(54) PUMPING METHOD AND UNIT FOR OPTICAL AMPLIFIERS

(75) Inventors: Aurelio Pianciola, Casteggio (IT); Marco De Donno, Pavia (IT); Paolo Milanese, Olevano di Lomellina (IT)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/027,105

(22) Filed: Dec. 20, 2001

(65) Prior Publication Data

US 2002/0163714 A1 Nov. 7, 2002

Related U.S. Application Data

(60) Provisional application No. 60/258,563, filed on Dec. 29, 2000.

(30) Foreign Application Priority Data

Dec. 27, 2000 (EP) .............................. 00204828

(51) Int. Cl.$^7$ ................................................ H01S 3/00
(52) U.S. Cl. ........................ 359/341.3; 359/341.32; 359/341.33
(58) Field of Search ................... 359/341.3, 341.32, 359/341.33

(56) References Cited

U.S. PATENT DOCUMENTS

| 5,125,053 A | * | 6/1992 | Abe et al. ..................... 385/36 |
| 5,485,481 A | | 1/1996 | Ventrudo et al. |
| 5,513,033 A | * | 4/1996 | Bricheno et al. ........... 359/341 |
| 5,574,807 A | | 11/1996 | Snitzer |
| 5,699,377 A | | 12/1997 | Pan |
| 5,760,949 A | | 6/1998 | Motoshima et al. |
| 5,844,926 A | | 12/1998 | Byron et al. |

FOREIGN PATENT DOCUMENTS

| EP | 0 444 694 | | 9/1991 |
| EP | 0 707 224 | | 4/1996 |
| EP | 0 793 314 | | 3/2001 |
| EP | 1220383 A1 | * | 7/2002 |
| JP | 10-135550 | * | 10/1998 |

OTHER PUBLICATIONS

M. Ohashi et al, "Novel Pump–LD With Self Wavelength–Tuning Function," Proceedings of the 26$^{th}$ European Conference on Optical Communication, Sep., 2000, p. 123–4.
Raman Kashyap, "Fiber Bragg Gratings," Academic Press, 1999, p. 276–284.

* cited by examiner

Primary Examiner—Mark Hellner
(74) Attorney, Agent, or Firm—Ronald J. Paglierani

(57) ABSTRACT

Optical pumping unit comprising a first pump source adapted to emit a first pump radiation at wavelength $\lambda p1$; a second pump source adapted to emit a second pump radiation at wavelength $\lambda p2$, with wavelength $\lambda p2$ different from wavelength $\lambda p1$; and a common coupling section comprising a first and a second port connected to the first and second pump source for respectively receiving the first and the second pump radiation; a third port for a signal radiation at wavelength $\lambda s$; a fourth port, wherein the coupling section is adapted to combine, in the fourth port, the signal radiation and the first and second pump radiation through a reversal of the direction of propagation of the first pump radiation from the first port to the fourth port.

32 Claims, 8 Drawing Sheets

PUMPING METHOD AND UNIT FOR OPTICAL AMPLIFIERS

CROSS-REFERENCE TO RELATED APPLICATIONS

This application claims the benefit of priority under 35 U.S.C. §119 of European Patent Application Ser. No. EP00204828.8 filed on Dec. 27, 2000.

This application claims the benefit of priority under 35 U.S.C. §119(e) of U.S. Provisional Application Ser. No. 60/258,563 filed on Dec. 29, 2000.

BACKGROUND OF THE INVENTION

1. Field of the invention

The present invention relates to an optical pumping unit comprising a first and a second pump source for providing two pump radiations, and a common coupling section for coupling a first, a second and a third radiation.

The present invention also relates to an optical amplifier comprising said optical pumping unit and an optical communication line and an optical communication system comprising said optical pumping unit or said optical amplifier.

The present invention also relates to a coupling section and a method for coupling two pump radiations and a signal radiation.

2. Technical Background

In the present description and claims, the expression

"insertion losses undergone by a pump radiation", referred to a pumping unit, is used to indicate the difference, expressed in dB, between the power of the radiation emitted by a pump source of the pumping unit and the power in output from the pumping unit;

"100%λ optical coupler" is used to indicate an optical coupler comprising two optical paths coupled to one another and adapted to let pass substantially 100% of power of a radiation of wavelength λ from one optical path to the other, and to substantially maintain 0% of power along the same optical path;

"100%λx/0%λy WDM optical coupler" is used to indicate an optical coupler comprising two optical paths coupled to one another and adapted to let pass from one optical path to the other substantially 100% of power of a radiation at wavelength λx, and substantially 0% of power of a radiation at wavelength λy by maintaining substantially 0% of power of the radiation at wavelength λx and substantially 100% of power of the radiation at wavelength λy along the same optical path;

"50%λx/0%λy WDM optical coupler" is used to indicate an optical coupler comprising two optical paths coupled to one another and adapted to let pass from one optical path to the other substantially 50% of power of a radiation at wavelength λx and substantially 0% of power of a radiation at wavelength λy by maintaining substantially 50% of power of the radiation at wavelength λx and substantially 100% of power of the radiation at wavelength λy along the same optical path;

"50%λx/100%λy WDM optical coupler" is used to indicate an optical coupler comprising two optical paths coupled to one another and adapted to let pass from one optical path to the other substantially 50% of power of a radiation at wavelength λx and substantially 100% of power of a radiation at wavelength λy by maintaining substantially the remaining 50% of power of the radiation at wavelength λx and substantially 0% of power of the radiation at wavelength λy along the same optical path;

"optical transmission fibre" is used to indicate an optical fibre used in an optical communication line or system for transmitting optical signals from a point to another placed at an appreciable distance.

In the above definitions, the expression "substantially 100%" of power coupling is preferably used for indicating a power coupling at least equal to 90%; "substantially 0%" of power coupling, is preferably used for indicating a power coupling that is less than or equal to 10%, and "substantially 50%" of power coupling is preferably used for indicating a power coupling comprised between 45% and 55%.

A 100%λWDM, 100%λx/0%λy WDM, 50%λx/0%λy WDM, 50%λx/100%λy WDM optical coupler can be realised in micro-optics, fused fibre, integrated optics or through any other technique which allows the formation of waveguides at the optical frequencies.

An optical amplifier typically consists of an active means (for example, an optical fibre or a planar waveguide doped with a rare earth) and a pumping unit.

In turn, the pumping unit typically consists of a pump source (for example, a laser diode) adapted to provide a pump radiation at wavelength λp to the active means, and of a wavelength division multiplexing (or WDM) device for coupling the pump radiation at wavelength λp with a signal radiation to be amplified at wavelength λs.

Typically, the WDM device is a WDM optical coupler of the 100%λp/0%λs or 100%λs/0%λp type, with two inputs and two outputs, and it is adapted to couple—into one of the two outputs—substantially all the power of the pump radiations at wavelength λp and of the signal radiations at wavelength λs at its two inputs.

With the advent of WDM optical communication systems, there is the need of increasing the pump power of optical amplifiers, so as to effectively amplify a WDM optical signal.

A WDM optical signal is a signal comprising a plurality of N optical signals independent of one another, each at a predetermined central wavelength λ1, λ2 ... λN different from that of the other signals. The signals can also be both digital and analogue, and they have a certain spectral width around the value of the central wavelength.

Typically, in a WDM system, the various optical signals are generated by a plurality of optical sources, multiplexed so as to form a WDM signal, transmitted along the same optical transmission line (for example an optical fibre line) and then demodulated so as to be each received by a receiver.

Optical amplifiers used in transmission, reception and/or along a transmission line of a WDM optical system need high pump powers to efficiently amplify the plurality of optical signals forming the WDM optical signal.

For the purpose of meeting said requirement, the use of a pumping unit with two pump sources has been proposed.

More in particular, it has been proposed to combine two pump radiations provided by two pump sources in a single total pump radiation, and to combine said total pump radiation with the signal radiation.

For example, the use of a wavelength combiner or of a polarisation combiner—upstream of a WDM device used for coupling the total pump radiation with the signal radiation—has been proposed to combine the two pump radiations.

In the first case (FIG. 1), the pumping unit 10 comprises two laser diodes 11, 12, two optical fibre gratings 15, 17 respectively connected to the two lasers 11 and 12, a wavelength combiner 14 and a fused fibre 100%λp/0%λs WDM optical coupler 16. According to this solution, the pump radiations emitted by the two laser diodes 11, 12 have slightly different wavelengths (typically, by some nm) and the two optical fibre gratings 15, 17 are adapted to stabilise said wavelengths.

Since the wavelengths of the two pump radiations are very close to one another (by some nm), the wavelength combiner 14 is typically realised in micro-optics. In fact, a fused fibre 100%λp/0%λs WDM optical coupler of the type used for coupling the total pump radiation and the signal radiation (which typically have different wavelengths from one another, in the range of dozens or hundreds nm), is not adapted to combine wavelengths that are very close to one another (in the range of nm).

Considering Bragg gratings currently available on the market by JDS, E-TeK, Innovative Fibers, Sumitomo, Bragg Photonics, 3M, Optical Technologies Italia (having insertion losses that are more than or equal to about 0.2 dB) and micro-optics wavelength combiners and fused fibre 100%λp/0%λs WDM optical couplers currently available on the market by JDS, E-TeK, Oplink and Gould (having insertion losses that are respectively higher than or equal to about 0.6 dB and 0.3 dB), the Applicant has noted that in the pumping unit of FIG. 1 each pump radiation undergoes insertion losses higher than about 1.1 dB (that is, higher than about 23%).

Moreover, as the pumping unit of FIG. 1 consists of the micro-optics wavelength combiner 14, the two optical fibre gratings 15, 17 and the fused fibre 100%λp/0%λs WDM optical coupler 16, it is realised using different technologies. This makes the pumping unit less reliable and more expensive than a unit that is entirely realised with the same technology (for example, all in fibre or all in micro-optics).

In the second case of use of a polarisation combiner (FIG. 2), the pumping unit 10 comprises two laser diodes 11, 12 with polarisation-holding pigtail 11a, 12a, a polarisation combiner 13 and a fused fibre 100%λp/0%λs WDM optical coupler 16. According to this solution, the pump radiations emitted by the two laser diodes 11, 12 have the same wavelength, and the two pigtails 11a, 12a make said pump radiation have orthogonal polarisation states.

The Applicant checked that in this second pumping unit of FIG. 2, insertion losses undergone by the pump radiations are comparable to those undergone by the pump radiations in the pumping unit of FIG. 1.

Moreover, since the pumping unit of FIG. 2 requires the use of polarisation-maintaining components, it is difficult and expensive to be realised.

M. Ohashi et al. ("*Novel pump-LD with self wavelength-tuning function*", ECOC 2000) describe a pumping module comprising four laser diodes with emission at the wavelengths of 980, 982, 981, 983 nm, a wavelength combiner and a wide band optical fibre Bragg grating (FBG). In turn, the wavelength combiner consists of three cascaded fused-tapered Mach-Zehnder interferometers.

The pump radiations combined with the described module are intended to be coupled—through a distinct WDM device—with the radiation of the signal to be amplified, to be sent along an active optical fibre of an optical amplifier.

Nevertheless, the Applicant has noted that also in this case, the insertion losses undergone by the pump radiations are equally high (about 1.1 dB).

The Applicant has noted that the above proposed solutions all have a coupling section of the pump radiation which is clearly distinct from the coupling section of the total pump radiation with the signal radiation. This makes it necessary to use a certain number of optical components in cascade—such as, for example, polarisation combiners, 100%λx/0%λy WDM optical couplers, micro-optics wavelength combiners, Mach-Zehnder interferometers—which introduce undesired insertion losses on the pump radiations.

Thus, the Applicant faced the technical problem of reducing the insertion losses undergone by the pump radiations of an optical pumping unit having at least two pump sources.

BRIEF SUMMARY OF THE INVENTION

The Applicant has found that, by using a common coupling section for mixing at least two pumping radiations and the signal radiation, the optical power losses undergone by the pump radiations significantly reduce.

Thus, in a first aspect thereof, the present invention relates to an optical pumping unit comprising a first pump source adapted to emit a first pump radiation at wavelength $\lambda p1$;

a second pump source adapted to emit a second pump radiation at wavelength $\lambda p2$, with wavelength $\lambda p2$ different from wavelength $\lambda p1$; and a common coupling section comprising a first and a second port connected to the first and second pump source for respectively receiving the first and the second pump radiation;

a third port for a signal radiation at wavelength $\lambda s$;

a fourth port, wherein said coupling section is adapted to combine, in the fourth port, the signal radiation and the first and second pump radiation by means of a reversal of the direction of propagation of the first pump radiation from the first port to the fourth port.

Since the optical pumping unit of the invention uses a common coupling section with all of the above features for coupling pump and signal radiations, it eliminates the need of using distinct coupling sections for combining the pump radiations in a total pump radiation and the total pump radiation with the signal radiation. Thus, it allows using a limited number of optical components in cascade, thus reducing the insertion losses undergone by the pump radiations.

Moreover, by using a limited number of optical components in cascade, the optical pumping unit of the invention is more compact and less expensive to be realised than the above-mentioned conventional pumping units.

In fact, a limited number of optical components allows simplifying the step of assembly of the pumping unit (thus reducing, for example, the number of junctions to be made between the components) and limiting production times and costs.

Typically, the wavelength $\lambda s$ of the signal radiation is higher than wavelengths $\lambda p1$ and $\lambda p2$ of the pump radiations.

Advantageously, the difference ($\lambda s - \lambda p_{max}$) between wavelength $\lambda s$ and the highest $\lambda p_{max}$ between wavelengths $\lambda p1$ and $\lambda p2$ is equal to at least 30 nm. In a preferred embodiment, it is equal to at least 530 nm.

Advantageously, the difference between wavelengths $\lambda p1$ and $\lambda p2$ is less than or equal to, 30 nm. Preferably, it is less than or equal to, 20 nm. More preferably, it is less than or equal to, 10 nm.

Typically, in the case of application of the pumping unit for pumping an erbium-doped optical amplifier, wavelengths $\lambda p1$ and $\lambda p2$ are selected within an interval of wavelengths comprised between about 975 and 985 nm and/or 1470 and 1490 nm whereas wavelength $\lambda s$ is selected within an interval of wavelengths comprised between about 1520 and 1630 nm.

In turn, in the case of application of the pumping unit for mixing three signal radiations in the treatment of WDM signals, wavelengths $\lambda p1$ and $\lambda p2$ are, for example, selected at about 1530 nm and respectively, 1550 nm whereas wavelength $\lambda s$ is selected at about 980nm.

Typically, the coupling section has a first and a second side, the one opposed to the other. Advantageously, the first and the fourth port of the coupling section are located at the first side, while the second and the third port are at the second side, in positions respectively corresponding to the first and the fourth port.

Preferably, the coupling section comprises
  a first optical path which connects the first and the second port; and
  a second optical path, in communication with the first optical path, which connects the third and the fourth port,
and it is adapted to send to the fourth port the first pump radiation, which propagates along the first optical path from the first port to the second port, making it pass from the first optical path to the second optical path and reflecting it back towards the fourth port.

Advantageously, the coupling section is also adapted to send to the fourth port the second pump radiation, which propagates along the first optical path from the second port towards the first port, making it pass from the first optical path to the second optical path.

Moreover, the coupling section is also preferably adapted to let the signal radiation propagate along the second optical path.

According to an embodiment, the signal radiation propagates along the second optical path from the third port to the fourth port.

According to an alternative embodiment, the signal radiation propagates along the second optical path from the fourth port towards the third port.

Advantageously, the coupling section comprises an optical reflection element adapted to reflect the first pump radiation at wavelength $\lambda p1$ towards the fourth port, and to let the second pump radiation at wavelength $\lambda p2$ and the signal radiation at wavelength $\lambda s$ pass.

Preferably, said optical reflection element is a Bragg grating. As an alternative, said optical reflection element is a thin-film optical filter, such as a Fabry-Perot interferometer.

Preferably, the coupling section is of the interferometric type.

Advantageously, the first optical path comprises a waveguide.

Advantageously, the second optical path comprises a waveguide.

Preferably, said waveguide is an optical fibre. According to an alternative, it is a planar waveguide realised in integrated optics.

Preferably, the first and the second optical path are coupled along a coupling area.

More preferably, the coupling area is such as to let substantially all the power of the signal radiation at wavelength $\lambda s$ propagate along the second optical path, and to let substantially all the power of the first pump radiation at wavelength $\lambda p1$ and substantially all the power of the second pump radiation at wavelength $\lambda p2$ pass from the first optical path to the second optical path.

Advantageously, the first and the second optical path form a WDM optical coupler of the 100%$\lambda p1$, $\lambda p2$/0%$\lambda s$ type, comprising two waveguides coupled with one another in said coupling area.

Preferably, the 100%$\lambda p1$, $\lambda p2$/0%$\lambda s$ WDM optical coupler is a fused fibre optical coupler. According to an alternative, it is realised in integrated optics (for example, in planar waveguide).

Preferably, the optical reflection element is positioned in the coupling area of the first and the second optical path.

More preferably, the optical reflection element is positioned in a point of the coupling area at which about 50% of power of the first pump radiation passes from the first optical path to the second optical path.

According to an embodiment, the first and the second optical path are also coupled along a second coupling area.

In the optical pumping unit according to this embodiment, the first and the second optical path advantageously comprise an input coupler, an output coupler, an upper arm and a lower arm. Moreover, the input coupler has four ports of which two are the second and the third port of the coupling section, and two are in communication with the upper arm and the lower arm, while the output coupler has four ports of which two are the first and the fourth port of the coupling section, and two are in communication with the upper arm and the lower arm.

In the optical pumping unit according to this embodiment, the coupling section preferably comprises also a second optical reflection element adapted to reflect the first pump radiation at wavelength $\lambda p1$ towards the fourth port, and to let the second pump radiation at wavelength $\lambda p2$ and the signal radiation at wavelength $\lambda s$ pass, the first optical reflection element being arranged in said upper arm and the second optical reflection element being arranged in said lower arm.

The input coupler and the output coupler preferably are two WDM optical couplers of the 50%$\lambda p1$, $\lambda p2$/0%$\lambda s$ type, each comprising two waveguides coupled with one another in said first and said second coupling area.

The input and output optical couplers and the two upper and lower arms are preferably realised in optical fibre. According to an alternative, they are realised in integrated optics (for example, in planar waveguide).

In a second aspect thereof, the invention also relates to an optical amplifier for amplifying a signal radiation at wavelength $\lambda s$ comprising a dielectric guiding active means and a pumping unit of the type described above with reference to the first aspect of the invention wherein the fourth port of the coupling section is in communication with the active means.

Advantageously, the active means is an optical waveguide doped with at least one rare earth. Typically, said at least one rare earth is erbium.

Typically, the doped optical waveguide is an optical fibre or a planar waveguide realised in integrated optics.

In a third aspect thereof, the invention also relates to an optical communication line comprising a transmission optical fibre length and a pumping unit of the type described above with reference to the first aspect of the invention wherein the fourth port of the coupling section is in communication with said transmission optical fibre length.

In a fourth aspect thereof, the invention also relates to an optical communication line comprising a transmission optical fibre length and an optical amplifier, of the type described above with reference to the second aspect of the invention, in communication with said transmission optical fibre length.

In a fifth aspect thereof, the present invention also relates to an optical communication system comprising
  a transmitting station adapted to provide a signal radiation having wavelength $\lambda s$;
  an optical transmission line, optically connected to said transmitting station, for transmitting said signal radiation;

a receiving station, optically connected to said optical transmission line, for receiving said signal radiation;

at least one pumping unit, of the type described above with reference to the first aspect of the invention, in communication with said optical transmission line.

In a sixth aspect thereof, the present invention also relates to an optical communication system comprising a transmitting station adapted to provide a signal radiation having wavelength $\lambda s$;

an optical transmission line, optically connected to said transmitting station, for transmitting said signal radiation;

a receiving station, optically connected to said optical transmission line, for receiving said signal radiation;

at least one optical amplifier, of the type described above with reference to the second aspect of the invention, in communication with said optical transmission line.

Advantageously, said transmitting station is adapted to provide a WDM optical signal comprising a plurality of N signals having wavelengths $\lambda 1, \lambda 2 \ldots \lambda N$.

In this case, said receiving station is advantageously adapted to receive and demultiplex said WDM optical signal.

In a seventh aspect thereof, the present invention also relates to an optical coupling section for coupling a signal radiation at wavelength $\lambda s$, a first pump radiation at wavelength $\lambda p1$ and a second pump radiation at wavelength $\lambda p2$, comprising a first and a second port for receiving respectively the first and the second pump radiation;

a third port for the signal radiation; and a fourth port, and being adapted to combine the signal radiation and the first and second pump radiation in the fourth port through a reversal of the direction of propagation of the first pump radiation from the first port to the fourth port.

As regards the features of the coupling section and of the pump and signal radiations, reference shall be made to what described above with reference to the pumping unit according to the first aspect of the invention.

In an eighth aspect thereof, the present invention also relates to an optical coupling section, for coupling a first radiation at wavelength $\lambda p1$, a second radiation at wavelength $\lambda p2$ and a third radiation at wavelength $\lambda s$, comprising a first and a second port for respectively receiving the first and the second radiation;

a third port for the third radiation; and a fourth port, and being adapted to combine the first, the second and the third radiation in the fourth port through a reversal of the direction of propagation of the first radiation from the first port to the fourth port.

As regards the features of the coupling section of the first, second and third radiation, reference shall be made to what described above with reference to the pumping unit according to the first aspect of the invention, and with reference to the first and second pump radiation and to the signal radiation.

In a further aspect thereof, the present invention also relates to a method for coupling a first radiation at wavelength $\lambda p1$, a second radiation at wavelength $\lambda p2$ and a third radiation at wavelength $\lambda s$ through a common coupling section having a first and a second side that are opposed to one another, the first side comprising a first and a fourth port and the second side comprising a second and a third port, said method comprising the steps of a) propagating the second radiation from the second port to the first port;

b) deviating the path of the second radiation so as to send it to the fourth port;

c) sending the third signal radiation from the third port to the fourth port, or vice versa, from the fourth port to the third port;

d) propagating the first radiation from the first port to the second port; and e) reversing the direction of propagation of the first radiation to send it to the fourth port.

Advantageously, the common coupling section also comprises a first optical path connecting the first and the second port, and a second optical path, in communication with the first optical path, connecting the third and the fourth port.

Preferably, step a) is carried out by sending the second radiation along the first optical path from the second port to the first port.

Moreover, step b) is preferably carried out by making the second radiation pass from the first optical path to the second optical path.

Advantageously, step c) is carried out by letting the third radiation propagate along the second optical path.

Preferably, step d) is carried out by sending the first radiation along the first optical path from the first port to the second port.

Moreover, step e) is preferably carried out by making the first radiation pass from the first optical path to the second optical path and back-reflecting it towards the fourth port.

Advantageously, the passage from the first to the second optical path of steps b) and e) occurs by interferometric effect.

As regards the features of the coupling section and of the first, second and third radiation, reference shall be made to what described above with reference to the pumping unit according to the first aspect of the invention and to the first and second pump radiation and to the signal radiation.

BRIEF DESCRIPTION OF THE DRAWINGS

Features and advantages of the invention shall now be described with reference to embodiments shown by way of a non-limiting example in the attached drawings. In such drawings.

DETAILED DESCRIPTION OF THE PREFERRED EMBODIMENTS

Figure 3A:
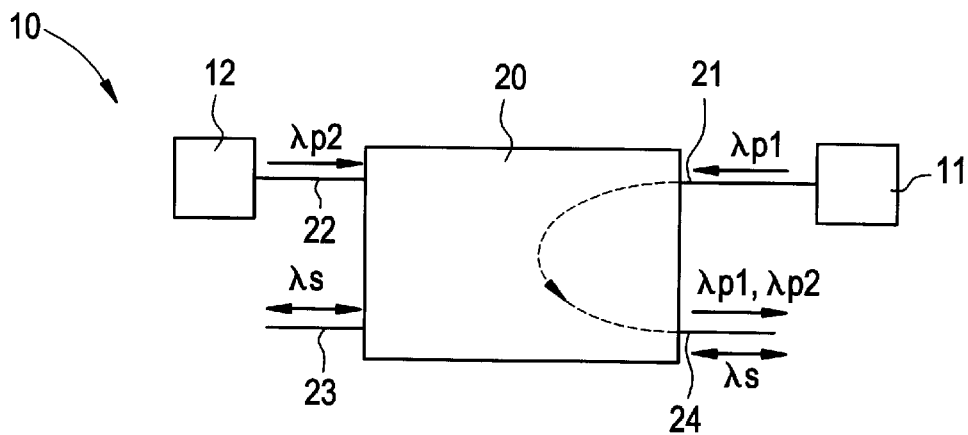
FIGS. 3a, 3b and 3c show three embodiments of an optical pumping unit according to the invention.

FIG. 3a shows an optical pumping unit 10 according to the invention, comprising a first pump source 11, a second pump source 12 and a common interferometric coupling section 20.

The first and the second pump source 11 and 12 are, for example, two laser diodes adapted to provide pump radiations having wavelengths λp1 and λp2 that are selected according to the applications of the pumping unit 10.

The coupling section 20 comprises a first 21 and a second 22 port for respectively receiving the first pump radiation and the second pump radiation; an input/output third port 23 for a signal radiation at wavelength λs (or for a WDM signal comprising a plurality of signal radiations at wavelengths λ1, λ2 . . . λN) and an input/output fourth port 24 for said pump and signal radiations.

The first and the fourth port 21, 24 are on an opposed side of the coupling section 20 with respect to that of the second and third port 22, 23. Moreover, the first port 21 is in a position corresponding to the second port 22, whereas the fourth port 24 is in a position corresponding to the third port 23.

As shown in FIG. 3a, the coupling section is adapted to combine the first and the second pump radiation and the signal radiation into port 24 through a reversal of the direction of propagation of the first pump radiation from the first port 21 towards the fourth port 24.

Figure 3B:
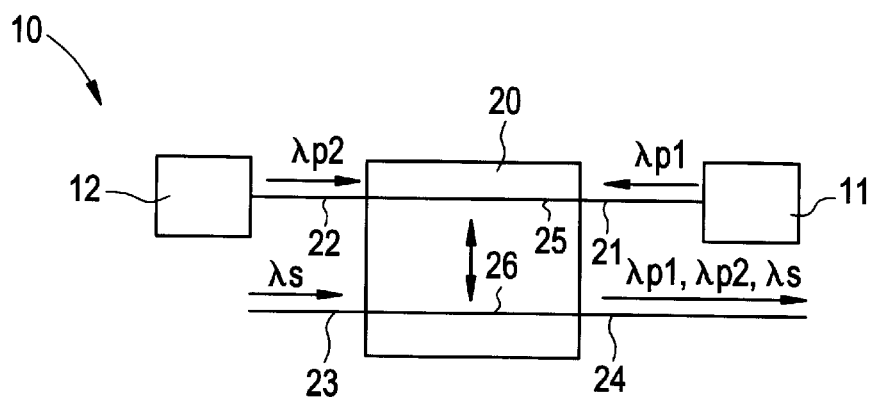

In the embodiment of FIG. 3b, the first 21 and the second 22 port are connected through a first optical path 25 whereas the third and fourth port are connected through a second optical path 26 in communication with the first optical path 25.

Moreover, the coupling section 20 is adapted to send, to the fourth port 24 the first pump radiation, which propagates along the first optical path 25 from the first port 21 towards the second port 22, making it pass from the first optical path 25 to the second optical 26 and reversing its direction of propagation;

the signal radiation, which propagates along the second optical path 26 from the third port 23 to the fourth port 24, letting it propagate along the second optical path 26;

the second pump radiation, which propagates along the first optical path 25 from the second port 22 towards the first port 21, making it pass from the first optical path 25 to the second optical path 26.

Thus, at the fourth port 24, the signal and pump radiations are co-propagating.

Figure 3C:
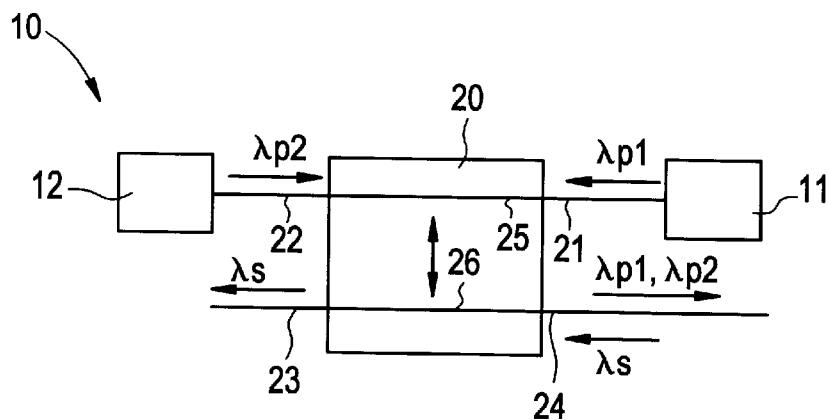

FIG. 3c shows an alternative embodiment of the optical pumping unit 10 which is totally similar to that of FIG. 3b except in that, at port 4, the pump radiations propagate in a counter-propagating direction with respect to the direction of the signal radiation.

In fact, in the embodiment of FIG. 3c, the fourth port 24 functions as output port for the first and the second pump radiation, and as input port for the signal radiation. Moreover, the third port 23 functions as output port for the signal radiation.

In addition, the coupling section 20 is adapted to send the signal radiation to the third port 23, which propagates along the second optical path 26 from the fourth port 24 to the third port 23, letting it propagate along the second optical path 26.

Figure 4:
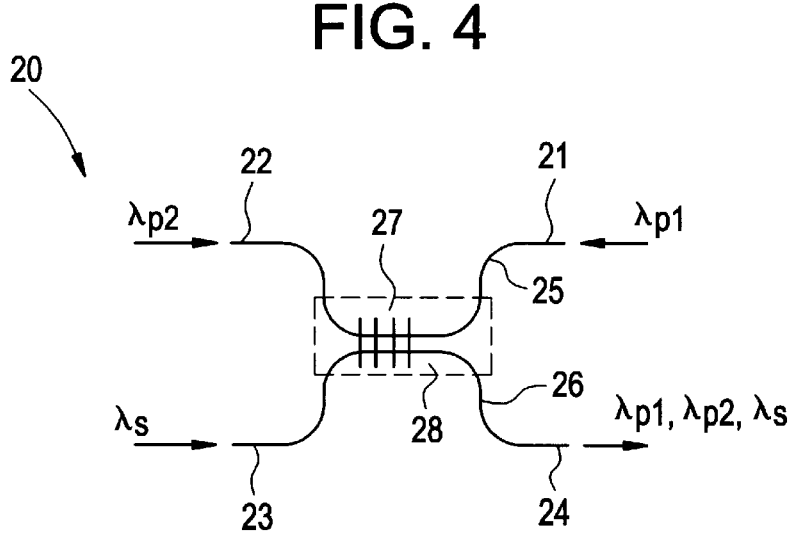
FIG. 4 shows a first embodiment of a coupling section according to the invention.

FIG. 4 shows a first embodiment of a common interferometric coupling section 20 according to the invention.

In such embodiment, the first and the second optical path 25 and 26 comprise two optical fibres forming a 100%λp1, λp2/0%λs WDM fused fibre optical coupler. More in particular, the 100%λp1, λp2/0%λs WDM optical coupler consists of two fibres, fused with one another in a coupling area 28 such as to allow a coupling from one fibre to the other of substantially 100% of power of the pump radiations at wavelengths λp1 and λp2 and of substantially 0% of power of the signal radiation at wavelength λs (or, in the case of WDM signal, at wavelengths λ1, λ2 . . . λN).

In this way, in the coupling section 20, the signal radiation is let to propagate from the third port 23 to the fourth port 24 along the second optical path 26; whereas the second pump radiation is let to propagate, along the first optical path 25, from the second port 22 towards the first port 21 up to the coupling area 28, where substantially 100% of its power is coupled to the optical fibre of the second optical path 26, where it propagates up to the fourth port 24.

Moreover, the coupling section 20 comprises an optical reflection element 27 having a reflection spectrum comprised in a band of wavelength Δλp1 centred at about λp1 such as to reflect the first pump radiation at wavelength λp1 and to let the second pump radiation at wavelength λp2 and the signal radiation(s) at wavelength(s) λs/λ1, λ2 . . . λN pass.

Advantageously, in the embodiment shown, the optical reflection element 27 is an optical fibre Bragg grating.

Moreover, it is preferably written in the coupling area 28 of the 100%λp1, λp2/0%λs WDM optical coupler at the point in which a transfer of substantially 50% of power of the first pump radiation has been reached between one fibre to the other of the coupler.

In this way, in the coupling section 20, the first pump radiation is let to propagate, along the first optical path 25, from the first port 21 towards the second port 22 up to the coupling area 28. In the coupling area 28, the first pump radiation is then back-reflected towards the fourth port 24 by the optical reflection element 27 and substantially 100% of its optical power is coupled to the optical fibre of the second optical path 26.

In fact, the 100%λp1, λp2/0%λs WDM optical coupler with the Bragg grating 27 written in the coupling area 28 behaves towards the first pump radiation at wavelength λp1, like an optical 100%λp1 Bragg reflecting coupler (or BRC) as described, for example, by Raman Kashyap, "Fiber Bragg Gratings", Academic Press, pages 276–284.

However, in the mentioned reference, the Bragg grating is written on a coupler of the 100%λ type, whereas in the coupling section 20 it is written on a 100%λp1, λp2/0%λs WDM coupler. As regards to this, it is worth noting that the function performed by the 100%λp1, λp2/0%λs WDM coupler of combining a pump radiation λp with a signal radiation λs cannot be carried out by a coupler of the 100%λ type—which is, for example, used for realising an optical 100%λ Bragg reflecting coupler for adding/dropping channels of a WDM system—since said coupler is not wavelength selective.

Thus, the coupling section 20 of FIG. 4 allows coupling the first pump radiation, the second pump radiation and the signal radiation in the fourth port 24 by using only a 100%λp1, λp2/0%λs WDM optical coupler with a Bragg grating 27 suitably written in the coupling area 28.

Figure 1:
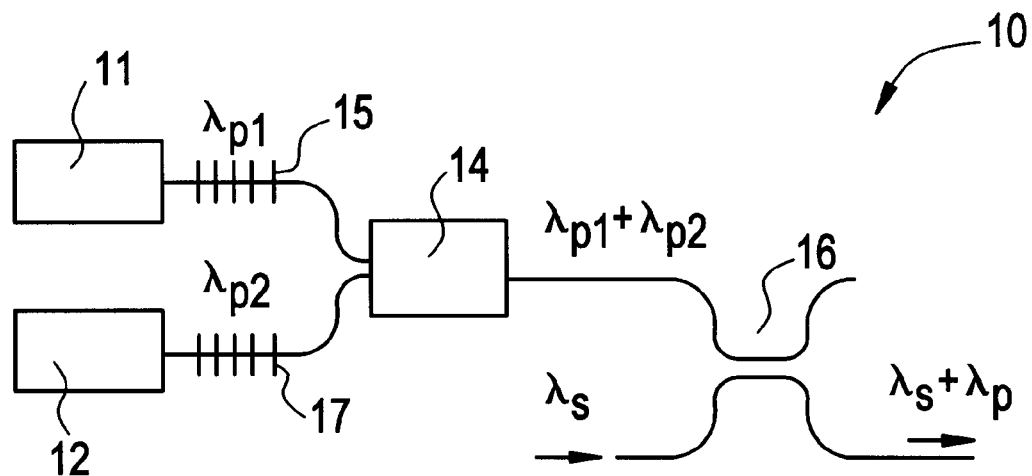
FIG. 1 describes a first embodiment of a pumping unit according to the prior art.
Figure 2:
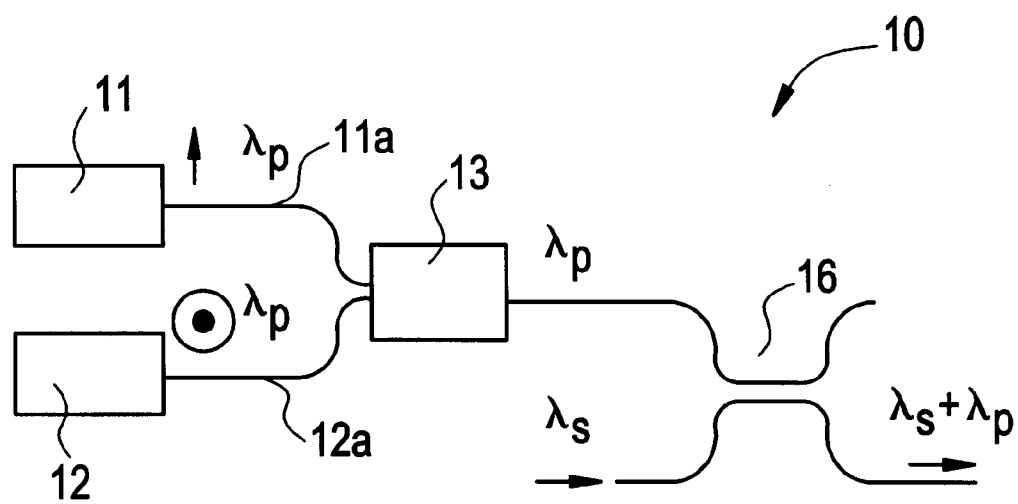
FIG. 2 describes a second embodiment of a pumping unit according to the prior art.

With respect to the prior art, wherein the first and the second pump radiation and the signal radiation are coupled by using two distinct devices in cascade (for example, a wavelength combiner 14 and a 100%λp1, λp2/0%λs WDM optical coupler 16 or a polarisation combiner 13 and a 100%λp1, λp2/0%λs WDM optical coupler 16, as shown in FIGS. 1 and 2), the coupling section 20 according to the invention uses a limited number of passive optical components, and thus it allows reducing insertion losses undergone by pump radiations.

In fact, the Applicant has ascertained that the 100%λp1, λp2/0%λs WDM optical coupler with a Bragg grating 27 written in the coupling area 28 introduces insertion losses lower than about 0.4 dB.

Such losses are much lower than the insertion losses of 0.9 dB introduced, as already said above, by the cascade of the wavelength combiner 14 and of the 100%λp1, λp2/0%λs WDM optical coupler 16 or by the cascade of the polarisation combiner 13 and of the 100%λp1, λp2/0%λs WDM optical coupler 16 of FIGS. 1 and 2, considering the devices currently available on the market by JDS, E-TeK, Oplink and Gould.

Moreover, since the coupling section 20 of FIG. 4 has a limited number of passive optical components, it is more compact and reliable than those of the prior art.

Figure 5:
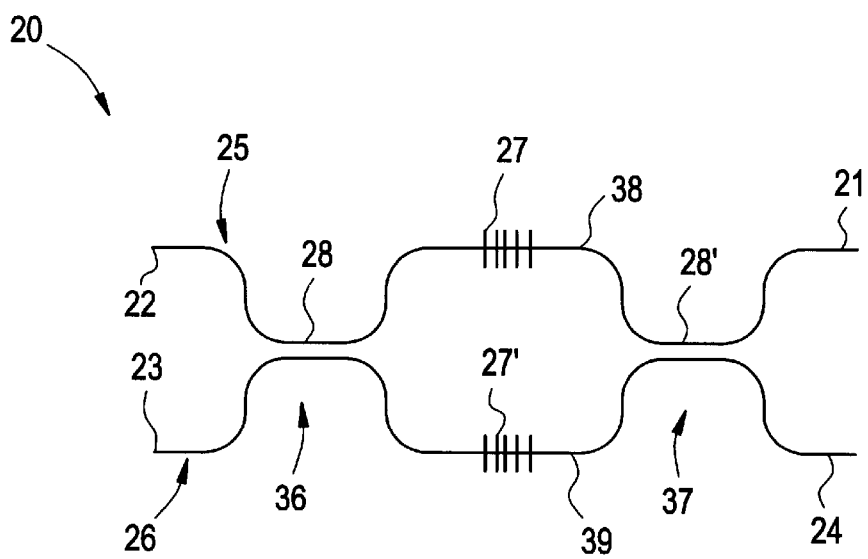
FIG. 5 shows a second embodiment of a coupling section according to the invention.

FIG. 5 shows a second embodiment of the coupling section 20 according to the invention.

In such embodiment, the first and the second optical path 25 and 26 comprise an input optical coupler 36, an upper arm 38, a lower arm 39 and an output coupler 37. The input coupler 36 has a first and a second port respectively corresponding to the second port 22 and to the third port 23 of the coupling section 20 and a third and a fourth port respectively connected to two ends of the upper arm 38 and of the lower arm 39. In turn, the output coupler 37 has four ports, of which two are connected to two ends of the upper arm 38 and of the lower arm 39 and the other two correspond to the first 21 and to the fourth 24 port of the coupling section 20. Moreover, the upper arm and the lower arm 38 and 39 respectively house a first and a second optical reflection element 27, 27'.

Couplers 36 and 37 are WDM optical couplers of the 50%λp1, λp2/0%λs type.

Moreover, the two optical reflection elements 27, 27' are two substantially identical Bragg gratings having a reflection spectrum comprised in a band of wavelength Δλp1 centred at about λp1 such as to reflect the first pump radiation at wavelength λp1 and to let the second pump radiation at wavelength λp2 and the signal radiation(s) at wavelength(s) λs/λ1, λ2 . . . λN pass.

In addition, the optical paths covered by the two pump radiations at wavelengths λp1 and λp2 through the two upper and lower arms 38, 39 are preferably balanced.

Advantageously, the coupling section 20 of FIG. 5 is realised in all-fibre technology, and the two Bragg gratings 27, 27' are written on the two upper and lower arms 38, 39 in optical fibre.

In this case, the first and the second optical path 25 and 26 preferably consist of only two portions of optical fibre suitably coupled to one another in a first 28 and a second 28' fusion coupling area so as to obtain the two optical couplers 36 and 37 and the two arms 38 and 39 of the coupling section 20 of FIG. 5.

Such configuration of the coupling section 20, realised in all-fibre technology and consisting of only two portions of optical fibre suitably coupled with one another in two fusion areas 28, 28', is advantageous because, since it does not exhibit internal junctions between the input and output couplers 36 and 37, the upper and lower arms 38 and 39 and the reflection elements 27, 27', it allows reducing insertion losses.

When the second pump radiation enters in the coupling section 20 of FIG. 5 through the second port 22, its optical power is split into two substantially equal components by the input optical coupler 36 (which is of the 50%λp1, λp2/0%λs type). Such components pass through the two upper 38 and lower 39 arms of the modified interferometer passing through the optical reflection elements 27, 27' and they continue towards the output coupler 37, where they recombine and exit from the coupling section 20 through the fourth port 24. In fact, when the second pump radiation enters in the coupling section 20 through the second port 22, its two components that propagate in the two upper 38 and lower 39 arms interfere constructively in the fourth port 24 and destructively in the first port 21. This is due to the fact that, as known, an optical signal passing through a 3 dB optical coupler (of the 50%λp1, λp2 type) by passing from a waveguide of the coupler to the other, undergoes a 90° phase shift with respect to the optical signal which passes through it by remaining in the same waveguide.

Thus, when the second pump radiation enters through the second port 22 of the coupling section, it exits—for an interferometric effect—from the fourth port 24.

In turn, when the signal radiation enters in the coupling section 20 of FIG. 5 through the third port 23, its optical power completely passes in the lower arm 39 through the input optical coupler 36 (which is of the 50%λp1, λp2/0%λs WDM type). Then, the signal radiation continues along the lower arm 39, where it passes through the optical reflection element 27' until it arrives into the output coupler 37 which, as it is of the 50%λp1, λp2/0%λs type, lets it exit from the fourth port 24 of the coupling section 20.

Finally, when the first pump radiation enters in the coupling section 20 of FIG. 5 through the first port 21, its optical power is split into two substantially equal components by the output optical coupler 37 (which is of the 50%λp1, λp2/0%λs type). Then, said components pass in the two upper 38 and lower 39 arms of the interferometer, they are back-reflected by the two optical reflection elements 27, 27', return towards the output coupler 37, where they recombine and exit from the coupling section 20 through the fourth port 24. In fact, for the reason already described above, the two components of the first pump radiation interfere constructively in the fourth port 24 and destructively in the first port 21.

It is worth noting that the same effect can be equally obtained by using two optical couplers 36, 37 of the 50%λp1, λp2/100%λs WDM type in place of the two couplers of the 50%λp1, λp2/0%λs WDM type, with the only difference that the signal radiation travels on the upper arm 38 rather than on the lower arm 39.

Figure 6:
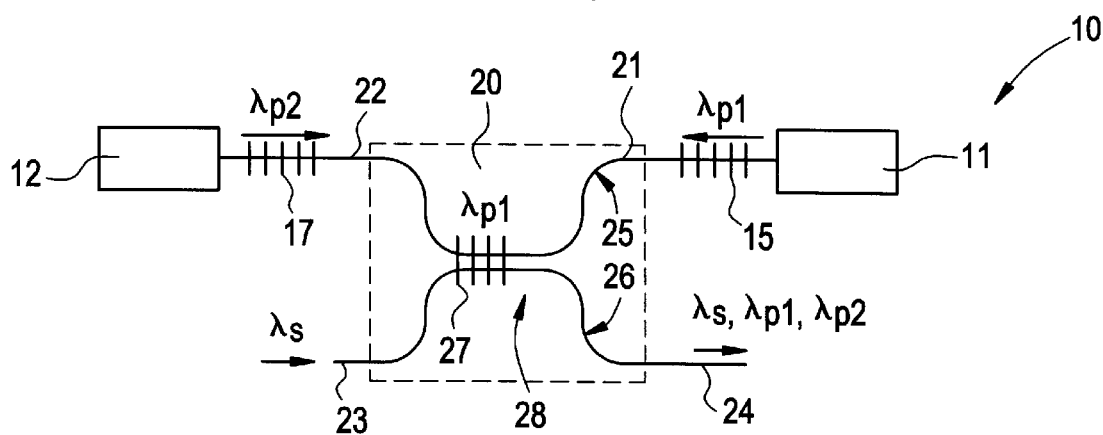
FIG. 6 shows an embodiment of a pumping unit according to the invention, having the coupling section of FIG. 4.

FIG. 6 shows an embodiment of the pumping unit 10 comprising a coupling section of the type described above with reference to FIG. 4, two pump sources 11, 12 and two stabilisation elements 15, 17 adapted to stabilise the emission wavelength of the two pump sources 11, 12 around the desired value of $\lambda$p1 and $\lambda$p2.

The two pump sources 11, 12 are, for example, two laser diodes with emission at about 980 and 984 nm having two pigtails.

Thus, the WDM optical coupler is of the 100% 980, 984 nm/0%$\lambda$s type (with $\lambda$s equal, for example, to about 1550 nm).

Moreover, the two stabilisation elements 15, 17 preferably are two Bragg gratings written on the two pigtails of the pump sources 11, 12 having reflection spectrums $\Delta\lambda$1 and $\Delta\lambda$2 respectively centred at about $\lambda$p1 (in the example equal to 984 nm) and $\lambda$p2 (in the example equal to 980 nm) and such as to ensure distinct spectrum intervals between the two pump sources 11, 12. In the example shown, the band of the reflection spectrums $\Delta\lambda$1 and $\Delta\lambda$2 is preferably less than 8 nm. For example, the band is of 2 nm.

The applicant has noted that the pumping unit of FIG. 6 introduces insertion losses on the pump radiations that are less than or equal to, about 0.6 dB (of which 0.2 dB are due to the stabilisation Bragg gratings 15, 17 and 0.4 dB are due to the coupling section 20).

Thus, the pumping unit 10 introduces lower insertion losses on the pump radiation with respect to those (higher by about 1.1 dB) introduced by the pumping units of the prior art described above.

Figure 7:
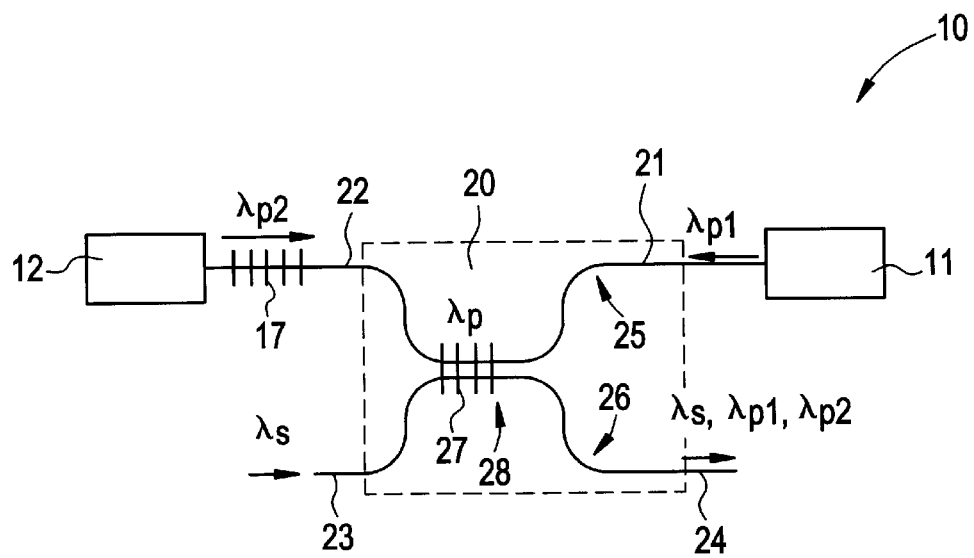
FIG. 7 shows an alternative embodiment of the pumping unit of FIG. 6.

FIG. 7 shows an embodiment of the pumping unit 10 totally equal to that of FIG. 6 except in that the stabilisation element 15 at the output of the first pump source 11 is not present. Moreover, the coupling section 20 is realised so that the reflection element 27 reflects a minimum percentage (for example, about 4%) of the first pump radiation towards the first pump source 11.

The desired percentage value of power of the first pump radiation back-reflected towards the first pump source 11 can be obtained through suitable U.V. trimming operations, described hereinafter with reference to FIG. 13, on the 100%$\lambda$p1, $\lambda$p2/0%$\lambda$s WDM coupler.

An alternative method to the UV trimming consists in writing the Bragg grating in the coupling area 28 of the 100%$\lambda$p1, $\lambda$p2/0%$\lambda$s coupler at a point in which the coupling is slightly (by about 2%) less than 50%. In this way, considering the forward and backward path of the first pump radiation, about 4% of reflected power of the first pump radiation on the first port 21 is obtained.

This embodiment of FIG. 7 is preferred with respect to that of FIG. 6 because, since the reflection element 27 is adapted to reflect a percentage of the first pump radiation towards the first pump source 11, it allows eliminating the presence of the stabilisation element 15, thus reducing the number of passive optical components of the pumping unit 10.

Figure 8:
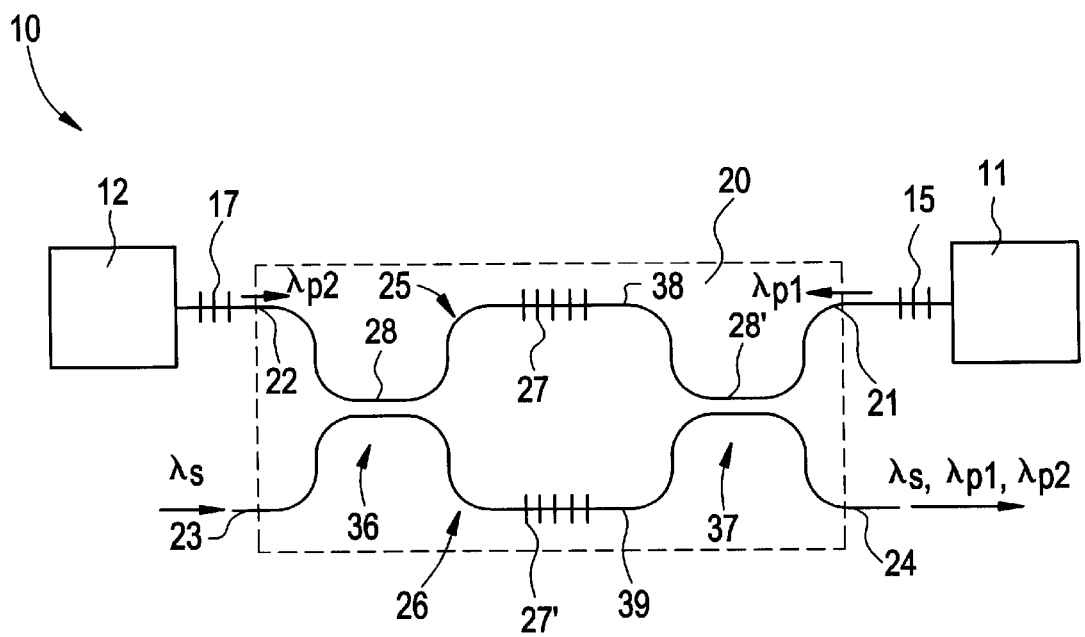
FIG. 8 shows an embodiment of a pumping unit according to the invention, having the coupling section of FIG. 5.

FIG. 8 shows an embodiment of the pumping unit 10 totally similar to that of FIG. 6 except in that the coupling section 20 is of the type described above with reference to FIG. 5.

Similarly to the pumping unit of FIG. 7, also in the case of FIG. 8 the stabilisation element 15 can be omitted and the reflection elements 27, 27' can be suitably positioned on the upper and lower arms 38, 39 so as to reflect a suitable percentage of power of the first pump radiation towards the first pump source 11.

As an alternative, the same effect can be obtained with suitable U.V. trimming operations.

Figure 9A:
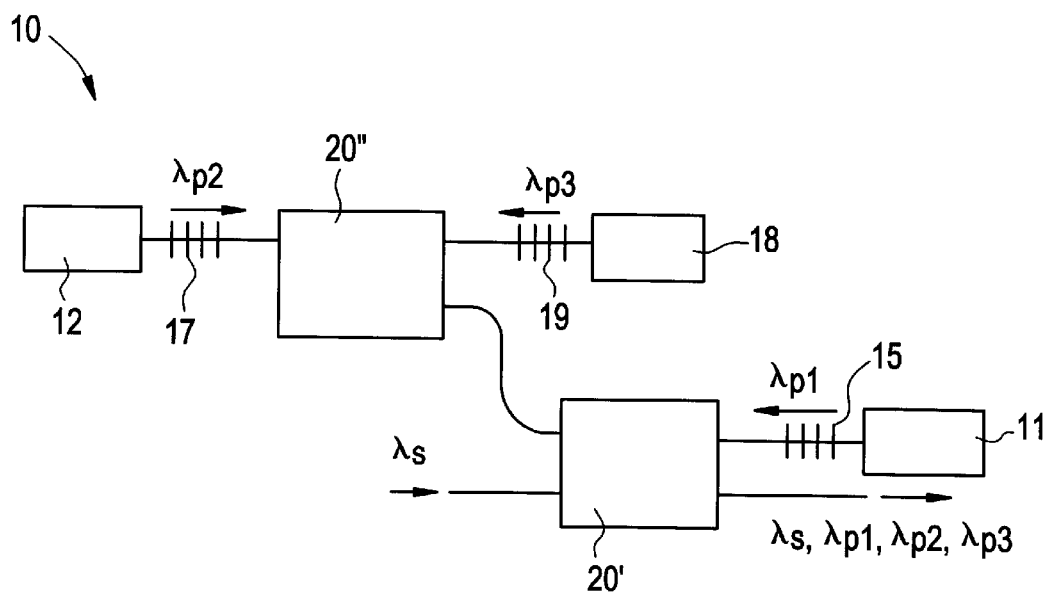
FIGS. 9a and 9b show two alternative embodiments of a pumping unit according to the invention with three pump sources.

FIG. 9a shows an embodiment of a pumping unit 10 which allows combining a first, a second and a third pump radiation at wavelengths $\lambda$p1, $\lambda$p2 and $\lambda$p3 with the signal radiation(s) at wavelength(s) $\lambda$s/$\lambda$1, $\lambda$2 ... $\lambda$N.

Such pumping unit 10 comprises three pump sources 11, 12 and 18, three stabilisation elements 15, 17, 19 and a coupling section 20 comprising two coupling subsections 20', 20".

As regards the features of the three pump sources 11, 12 and 18 and of the three stabilisation elements 15, 17, 19 reference shall be made to what described above with reference to FIGS. 3–8.

As regards the coupling subsection 20', it is totally similar to one of the coupling sections described above with reference to FIGS. 4 and 5, except in that the WDM optical couplers are of the 100%$\lambda$p1, $\lambda$p2, $\lambda$p3/0%$\lambda$s type (in case of a configuration similar to that of FIG. 4) or of the 50%$\lambda$p1, $\lambda$p2, $\lambda$p3/0%$\lambda$s type (in case of a configuration similar to that of FIG. 5).

Moreover, as regards the coupling subsection 20", it is totally equal to one of the coupling sections described with reference to FIGS. 4 and 5, except in that the reflection element(s) 27, 27' have a reflection spectrum centred at about $\lambda$p3 and the WDM optical couplers are of the 100%$\lambda$p2, $\lambda$p3/0%$\lambda$s type (in case of a configuration similar to that of FIG. 4) or of the 50%$\lambda$p2, $\lambda$p3/0%$\lambda$s type (in case of a configuration similar to that of FIG. 5).

Moreover, as regards the coupling subsection 20", it is worth noting that, since it does not have to couple the signal radiation, it does not need WDM optical couplers of the 100%$\lambda$p2, $\lambda$p3/0%$\lambda$s or 50%$\lambda$p2, $\lambda$p3/0%$\lambda$s type, and can thus use conventional optical couplers of the 100%$\lambda$p2, $\lambda$p3 or 50%$\lambda$p2, $\lambda$p3 type (that is, of the 3 dB type).

Figure 9B:
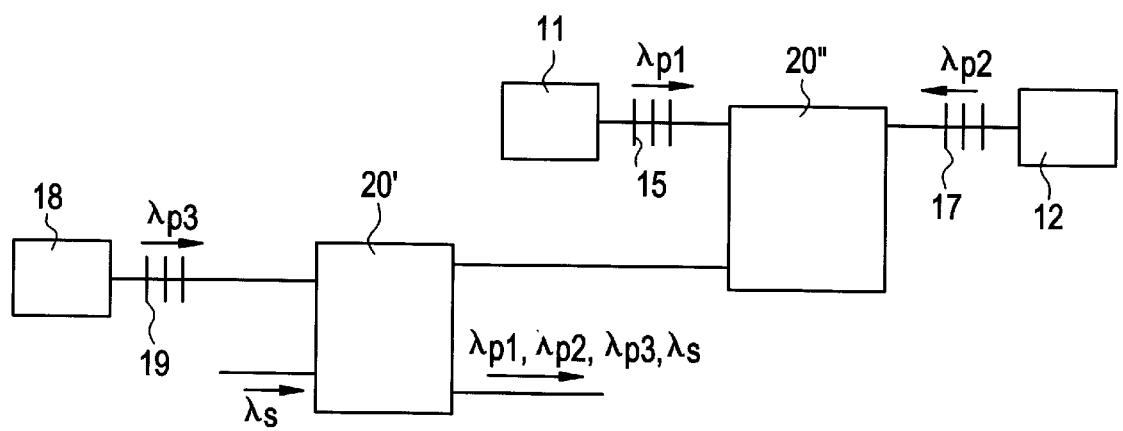

FIG. 9b shows an alternative embodiment of the pumping unit 10 of FIG. 9a for combining a first, a second and a third pump radiation at wavelengths $\lambda$p1, $\lambda$p2 and $\lambda$p3 with the signal radiation(s) at wavelength(s) $\lambda$s/$\lambda$1, $\lambda$2 ... $\lambda$N.

In the embodiment of FIG. 9b, the coupling subsection 20' is totally equal to one of the coupling sections described with reference to FIGS. 4 and 5, except in that the WDM optical couplers are of the 100%, p1, $\lambda$p2, $\lambda$p3/0%$\lambda$s type (in case of a configuration similar to that of FIG. 4) or of the 50%$\lambda$p1, $\lambda$p2, $\lambda$p3/0%$\lambda$s type (in case of a configuration similar to that of FIG. 5) and the reflection element(s) 27, 27' are adapted to reflect both wavelengths $\lambda$p1 and $\lambda$p2.

Moreover, the coupling subsection 20" is totally equal to one of the coupling sections described with reference to FIGS. 4 and 5.

However, similarly to what described in relation to FIG. 9a, since the coupling subsection 20" does not have to couple the signal radiation, it does not need WDM optical couplers of the 100%$\lambda$p1, $\lambda$p2/0%$\lambda$s type or of the 50%$\lambda$p1, $\lambda$p2/0%$\lambda$s type, and can thus use conventional optical couplers of the 100%$\lambda$p1, $\lambda$p2 or 50%$\lambda$p1, $\lambda$p2 type (that is, of the 3 dB type).

Also according to the two embodiments of FIGS. 9a and 9b with three pump sources, the pumping unit 10 of the invention uses a limited number of optical components. Thus, it allows reducing the insertion losses introduced on the pump radiations with respect to the pumping units of the prior art described above which, by first combining the pump radiations in a total pump radiation, and then the total pump radiation with the signal radiation by means of optical devices that are well distinct from one another, use a greater number of optical components and have higher insertion losses.

Should it be necessary to combine M pump sources with the signal radiation(s), the pumping unit 10 will comprise M pump sources and M-1 coupling subsections in a way similar to what described with reference to FIGS. 9a and 9b.

Figure 10:
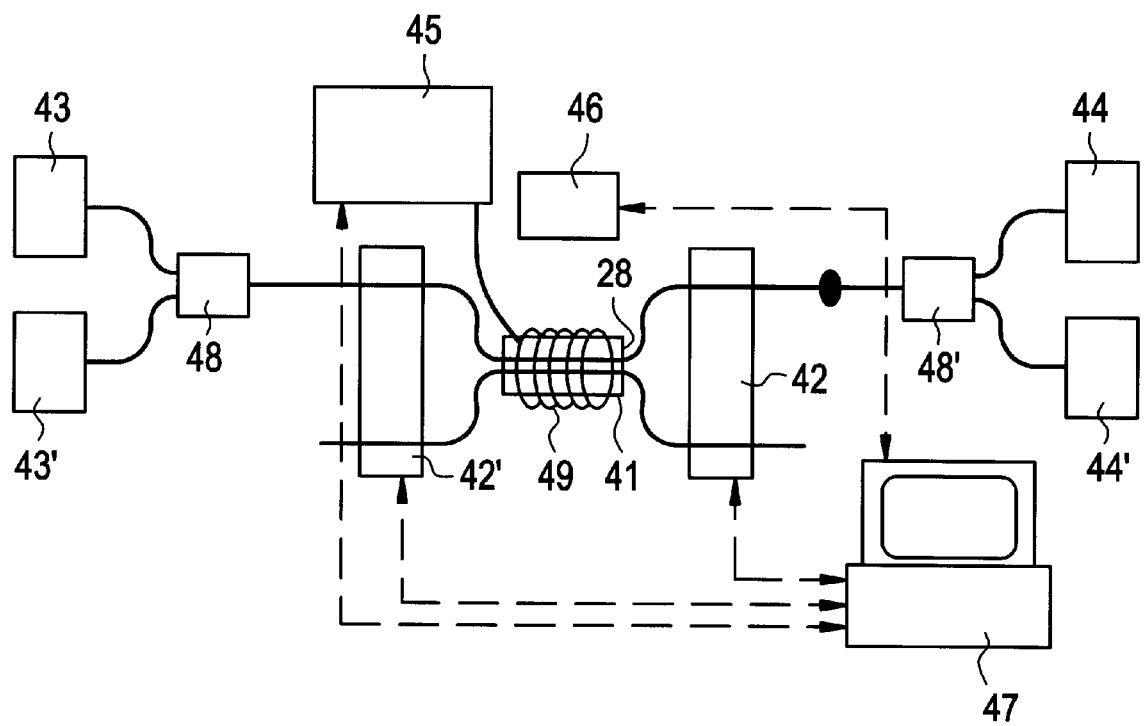
FIG. 10 shows an equipment used for producing a fused fibre WDM optical coupler of the 100%λp/0%λs type.

FIG. 10 shows an example of an equipment 40 used by the Applicant for producing a fused fibre WDM coupler of the 100λp/0%λs type, comprising a micro-furnace 41 in which the fibres of a coupler are fused in the coupling area 28; a pair of motors 42 and 42' for carrying out the elongation of the fibres at both sides; two sources 43 and 43' (which respectively emit a radiation at wavelength λs—for example, equal to about 1550 nm—and a radiation at wavelength λp—for example, centred at about 980 nm) and two optical signal detectors 44 and 44' respectively calibrated on the two wavelengths λs and λp. Moreover, equipment 40 comprises two conventional WDM couplers (for example, by E-Tek) 48 and 48' for mixing and splitting the two radiations respectively at wavelengths λs and λp; a radiofrequency generator 45 for heating, by induction, through a spiral winding 49, the micro-furnace 41; a pyrometer 46 for measuring the temperature outside micro-furnace 41 and a calculator 47 for controlling the fusion process.

Micro-furnace 41 consists of a platinum hollow cylinder having a length of about 13 mm.

At the moment of producing the 100%λp/0%λs WDM optical fibre coupler, the external coating of two optical fibres is removed by a length of about 35 mm, and the two fibres are fastened to motors 42 and 42'.

At this point, the temperature of micro-furnace 41 is brought to about 1580° C. and a pre-fusion of the optical fibres is carried out in the coupling area 28 for about 30 sec. Afterwards, a step is started for elongating the fibres by making motors 42, 42' move at the speed of about 45 mm/sec. During this step, the power of radiations at wavelengths λs and λp is constantly kept under control respectively by the two detectors 44 and 44'.

Figure 11:
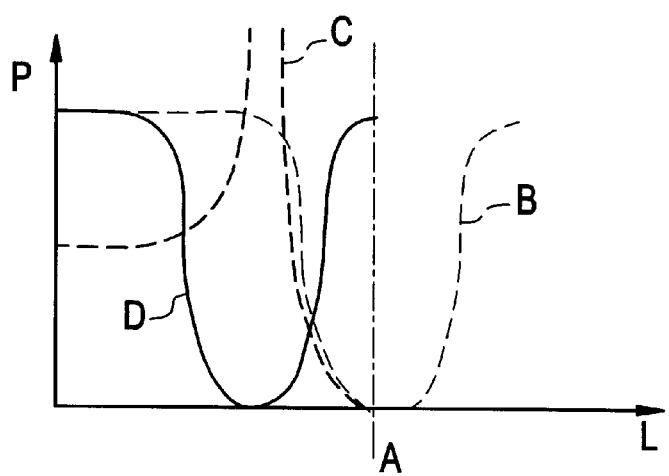
FIG. 11 shows the pattern of the optical power detected by two detectors of the equipment of FIG. 10 at wavelengths λs and λp in function of the elongation (L) of the fused fibres and the ratio between the two detected optical powers.

FIG. 11 shows the pattern of the optical power detected by the two detectors 44 and 44' at the two wavelengths λs and λp (respectively with curves D and B) in function of the elongation (L) to which the two fibres are subject during the fusion-elongation process, and the ratio between the optical power detected at the pump wavelength λp and the optical power detected at the signal wavelength λs (curve C).

The fusion and elongation process is stopped when the ratio between the optical power at the pump wavelength λp and the optical power at the signal wavelength λs reaches a value equal to about 1/1000 (point A of FIG. 11).

The optical features of a 100% 980 nm/0% 1550 nm WDM optical coupler obtained by the Applicant with the above method and using two initial optical fibres of the Flexcor 1060 model, produced by Corning, are shown in table 1.

TABLE 1

| | |
|---|---|
| IL (port 22 → port 24) @ 980 nm | ~0.35 dB |
| IL (port 23 → port 24) @ 1550 nm | ~0.30 dB |
| Crosstalk (port 22 → port 21) @ 980 nm | ~26 dB |
| Crosstalk (port 23 → port 21) @ 1550 nm | ~26 dB | where
the expression "IL (port 22→port 24) @ 980 nm" indicates the insertion losses undergone by the radiation at 980 nm passing through the WDM coupler from the second port 22 to the fourth port 24 (as regards the numbering of the WDM coupler ports, reference shall be made to FIG. 4), that is, it indicates the difference, expressed in dB, between the optical power of the radiation at 980 nm in input to the second port 22 and that in output from the fourth port 24;
the expression "IL (port 23→port 24) @ 1550 nm" indicates insertion losses undergone by the radiation at 1550 nm passing to through the WDM coupler from the third port 23 to the fourth port 24;
the expression "Crosstalk (port 22→port 21) @ 980 nm" indicates the difference, expressed in dB, between the optical power of the radiation at 980 nm in input to the second port 22 and that in output from the first port 21;
the expression "Crosstalk (port 23→port 21) @ 1550 nm" indicates the difference, expressed in dB, between the optical power of the radiation at 1550 nm in input to the third port 23 and that in output from the first port 21.

Figure 12:
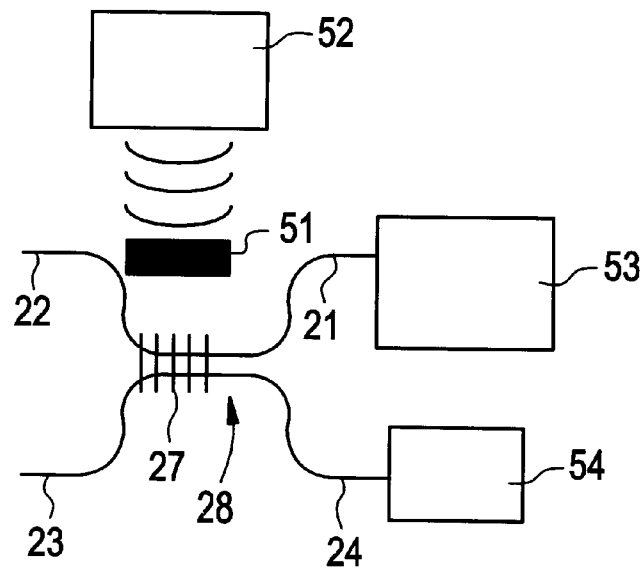
FIG. 12 shows a writing step of a Bragg grating on a fused fibre WDM coupler of the 100%λp/0%λs type.
Figure 13:
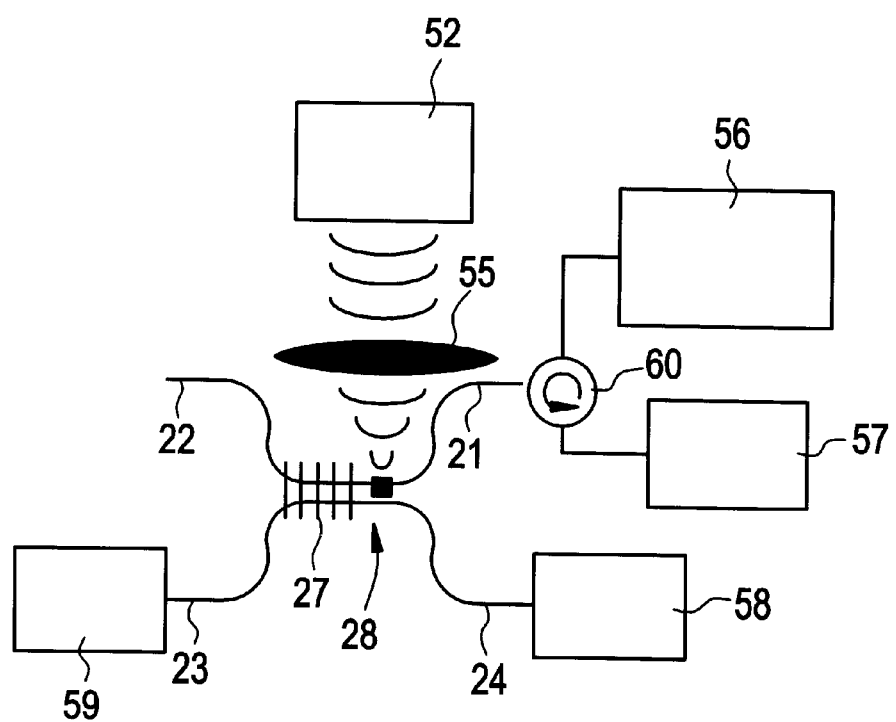
FIG. 13 shows a trimming step subsequent to the writing step of FIG. 12.

FIGS. 12 and 13 schematically show two successive steps of a write operation of a Bragg grating 27 in the coupling area 28 of a fused fibre WDM coupler of the 100%λp/0%λs type.

More in particular, FIG. 12 shows a first writing step of grating 27 through the use of a phase mask 51, a U.V. radiation source 52, a light source 53 connected to the first port 21 of the WDM coupler, and an optical spectrum analyser 54 connected to the fourth port 24.

The light source 53 emits a wideband radiation containing the wavelength λp1 of the first pump radiation (for example equal to 984 nm).

The phase mask 51 and the U.V. radiation source 52 are suitably arranged so as to realise the Bragg grating 27 in the point where the WDM coupler couples from one fibre to the other substantially 50% of optical power of the radiation at wavelength λp1.

Moreover, the U.V. radiation source 52 is kept on until the optical spectrum analyser 54 detects the desired optical power at wavelength λp1.

FIG. 13 shows a trimming step of the optical path length of the coupling area 28 which allows correcting possible errors of positioning of grating 27 with respect to the desired position.

Said trimming step is carried out through a U.V. radiation source 52, a laser diode 56 stabilised at the emission wavelength λp1 through, for example, a Bragg grating (not is shown) on its output pigtail, and three power meters 57, 58, 59 respectively connected to the first 21, the fourth 24 and the third 23 port of the WDM coupler.

The laser diode 56 and the power meter 57 are connected to the first port 21 through a conventional three-port optical circulator 60.

The UV trimming step consists in illuminating a limited portion of the coupling area 28 with the help of an optical focusing lens 55 so as to locally vary its mean refractive index and cause a variation of the optical path of the coupling area 28.

The illumination is continued until the following insertion loss (IL) values are reached:

IL (port 21→port 24) @ λp1≦0.5 dB
  IL (port 21→port 23) @ λp1≧20 dB
  IL (port 21→port 21) @ λp1~14 dB The insertion loss value of 14 dB from port 21 to port 21 allows obtaining the necessary back-reflected power value of the radiation having wavelength λp1 for stabilising the laser diode 11 when it is jointed to port 21 of the coupling section 20 without the stabilisation element 15 (see pumping unit of FIG. 7).

Starting from the above mentioned insertion loss values measured for the WDM coupler with grating 27 written in the coupling area 28, the insertion loss (IL) values of the different paths of said WDM coupler have been calculated in the case of wavelength λs equal to 1550 nm, wavelength λp1 equal to 984 nm and wavelength λp2 equal to 980 nm. The results are summarised in Table 2:

TABLE 2

| λ | INPUT | OUTPUT | IL |
| --- | --- | --- | --- |
| 1550 nm | Port 23 | Port 24 | ≦0.35 dB |
| 1550 nm | Port 23 | Port 21 | ≧25 dB |
| 980 nm | Port 22 | Port 24 | ≦0.40 dB |
| 980 nm | Port 22 | Port 23 | ≧24 dB |
| 980 nm | Port 22 | Port 22 | ≧25 dB |
| 980 nm | Port 22 | Port 21 | ≧26 dB |
| 984 nm | Port 21 | Port 22 | ≧31 dB |
| 984 nm | Port 21 | Port 23 | ≧26 dB |
| 984 nm | Port 21 | Port 21 | ~14 dB |
| 984 nm | Port 21 | Port 24 | ≦0.5 dB |

As regards the method for producing the WDM coupler with grating 27 written in the coupling area 28, it is worth noting that the writing of grating 27 causes an increase of the mean refractive index and thus, of the optical path length of the coupling area 28.

Since the optical path length of the coupling area 28 determines, as shown in FIG. 11, the quantity of coupled optical power from one fibre to the other of the 100%λp/0%λs WDM optical coupler, the writing of grating 27 can change the performances of such coupler.

For this reason, during the production of the WDM coupler, the above fusing and elongation step is stopped when the ratio between the powers at the two different wavelengths λp and λs reaches a slightly higher value than 1/1000 (a little before point A of FIG. 11). Then, after the writing step of grating 27 in the coupling area 28, a U.V. trimming step is carried out, adapted to adjust the optical path length of the coupling area 28 so as to obtain a value of the ratio between the powers at the two wavelengths λp and λs equal to about 1/1000.

Such U.V. trimming step is carried out in a way that is substantially similar to what described in relation to FIG. 13.

As regards the production of the optical couplers of a coupling section 20 of the type described with reference to FIG. 5 and the writing of Bragg gratings 27, 27' on the two upper 38 and lower 39 arms of said coupling section 20, such operations are carried out in a way similar to what described above in relation to FIGS. 10–13.

The pumping unit 10 according to the invention can be used in any application in which it is necessary to combine two or more pump sources with a signal radiation at wavelength λs (or a WDM signal). For example, it can be used for obtaining a high pump power in an optical amplifier, or for obtaining a high Raman gain in an optical fibre.

Figure 14A:
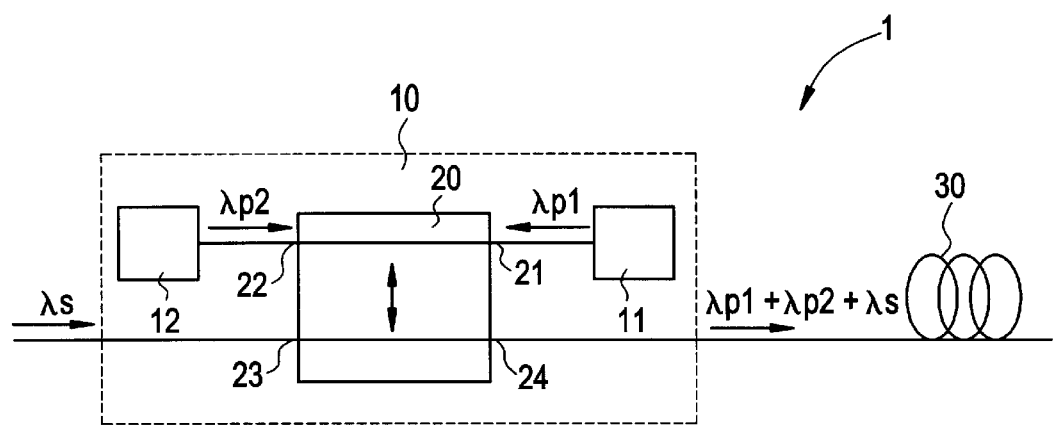
FIGS. 14a and 14b show two alternative embodiments of an optical amplifier according to the invention.

FIG. 14a shows an optical amplifier, according to an embodiment of the invention, for amplifying a signal radiation at wavelength λs or a WDM signal comprising a plurality of signals at wavelengths λ1, λ2, ... λN.

Such amplifier comprises a dielectric guiding active means 30 and a pumping unit 10 of the type described above with reference to FIGS. 3a, 3b, 4–8, having the fourth port 24 of the coupling section 20 connected to the active means 30.

In the embodiment shown, the active means 30 is an active optical fibre doped with a rare earth.

Among rare earths, erbium is the most frequently used component because its fluorescence spectrum has a band comprised between 1420 and 1650 nm, which corresponds to the third transmission window (centred at about 1550 nm) of a telecommunication signal.

As an alternative, the active means 30 can comprise a substratum with an active waveguide doped with a rare earth.

In this application, the first and the second pump radiation of the pumping unit 10 have wavelengths λp1 and λp2 corresponding to a peak of the absorption spectrum of the dopant substance of the active means 30 whereas the signal radiation(s) has/have wavelength(s) corresponding to a metastable level of such dopant substance.

Pump radiations are thus capable of bringing the ions of the dopant substance to an excited energetic level. From such level, ions fall spontaneously, in very short times, to a laser emission level or metastable level, where they remain for a relatively longer time (named mean lifetime of the metastable level).

When the signal radiation(s) having wavelengths corresponding to such metastable level pass through the active means 30 having a high number of excited ions on the metastable level, the excited ions fall to a lower level, thus causing a stimulated luminous emission having the same wavelengths as the signal radiations.

In the embodiment of FIG. 14a the pumping unit 10 is of the type described above with reference to FIG. 3b and the pump radiations travel in the active means 30 in a co-propagating direction with respect to the direction of the signal radiation (co-propagating pumping).

Figure 14B:
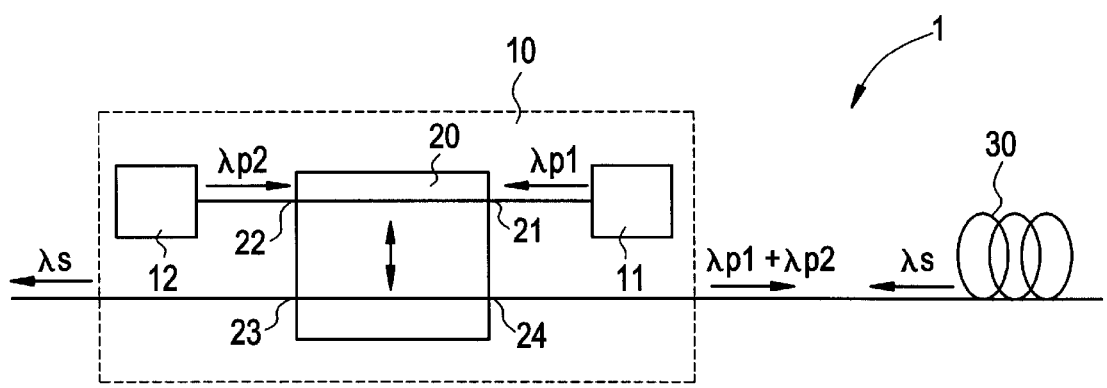

FIG. 14b shows an alternative embodiment of the optical amplifier 1 which is totally similar to that of FIG. 14a except in that the pumping unit 10 is of the type described above with reference to FIG. 3c and the pumping of the active means 30 occurs in a counter-propagating direction with respect to the direction of the signal radiation.

Should it be necessary to pump the optical amplifier 1 with more than two pump sources, the pumping unit 10 comprises three or more pump sources, and has a configuration similar to those of FIGS. 9a and 9b.

Figure 15:
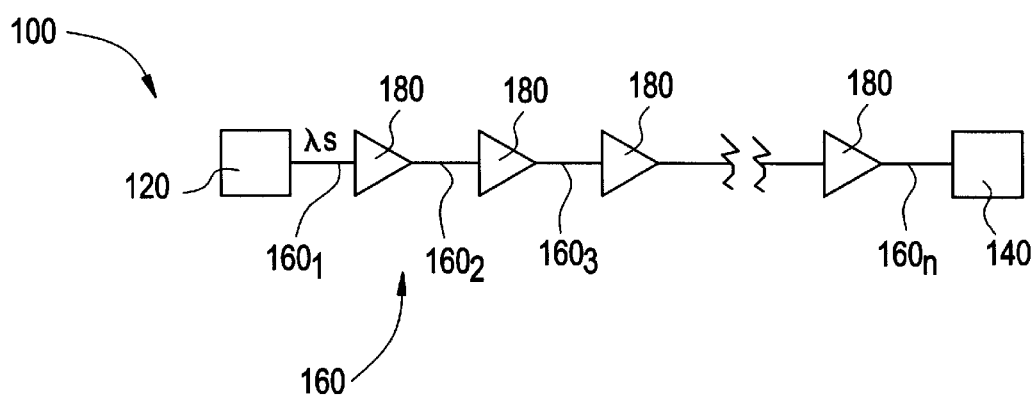
FIG. 15 shows an embodiment of an optical communication system according to the invention.

FIG. 15 shows a telecommunication system 100 according to the invention, comprising a transmitting station 120 for providing a signal radiation at a wavelength λs, a receiving station 140 for receiving said signal radiation, and an optical fibre transmission line 160 for transmitting the signal radiation from the transmitting station 120 to the receiving station 140.

According to a preferred embodiment, the telecommunication system is a WDM system.

In this case, the transmitting station 120 is a conventional WDM equipment adapted to provide N signal radiations having wavelengths λ1, λ2 ... λN which are different from one another, to wavelength multiplex them in a single WDM optical signal and to send such WDM optical signal along the optical transmission line 160. Moreover, said transmitting station 120 also comprises an optical power amplifier (booster, not shown) for amplifying the WDM optical signal before sending it along line 160 (or a certain number of boosters in parallel, for amplifying signal radiations comprised in different wavelength bands).

Such wavelengths λ1, λ2 ... λN are typically selected in an interval of wavelengths comprised between 1520 nm and 1630 nm.

For example, the telecommunication system 100 can be a WDM system with 128 channels, spaced from one another by 50 GHz and divided into three bands: 16 channels between 1529 and 1535 nm (first band); 48 channels between 1541 and 1561 nm (second band) and 64 channels between 1575 and 1602 nm (third band).

Said receiving station 140 comprises a conventional equipment adapted to demultiplex said N optical signals and to send them to optional successive processing stages. Moreover, said receiving station 140 typically comprises also an optical preamplifier (not shown) adapted to bring the WDM optical signal to a power level adapted to be received by the receiving equipment (or a certain number of optical preamplifiers in parallel for amplifying the signal radiations comprised in different wavelength bands).

Line 160 comprises a plurality of optical amplification units 180, each comprising an optical amplifier for amplifying a signal coming from an upstream line portion 160, wherein the signal has attenuated during its propagation along it, and sending it to a downstream line portion 160.

Each unit 180 can also comprise a certain number of optical amplifiers arranged in parallel for amplifying the signal radiations comprised in different wavelength bands (for example, the first, the second and third band mentioned above).

For example, system 100 can be a submarine telecommunication system, wherein line 160 comprises optical cables $160_1, 160_2, 160_3, \ldots 160_n$ which respectively connect the transmitting station 120 to the first amplifier 180, such amplifier to the next one and the last amplifier to the receiving station 140.

Each optical cable $160_1, 160_2, \ldots 160_n$ comprises at least one optical fibre, and has a length which can vary from some dozens kilometers to some hundreds kilometers.

Such optical fibres preferably are single-mode at the N wavelengths of transmission $\lambda 1, \lambda 2 \ldots \lambda N$ and they are, for example, of the step index type.

At least one of the optical power amplifier of the transmitting station 120, the preamplifier of the receiving station 140 and the optical amplifiers of the amplification units 180 is an optical amplifier according to the invention, of the type described above with reference to FIGS. 14a and 14b.

The present invention has been described, by way of an example, with reference to optical pumping units. However, it can be equally applied to devices for mixing at least three radiations at different wavelengths from one another in applications for treating WDM optical signals.

For example, the optical unit 10 of the invention can be used for mixing three WDM signal bands (or three signal radiations) centred at about 980 nm, 1530 nm and 1550 nm.

What is claimed is:

1. Optical pumping unit comprising
    a first pump source adapted to emit a first pump radiation at wavelength $\lambda p1$;
    a second pump source adapted to emit a second pump radiation at wavelength $\lambda p2$, with the wavelength $\lambda p2$ different from the wavelength $\lambda p1$; and
    a common coupling section comprising
        a first and a second port connected to the first and second pump source for respectively receiving the first and the second pump radiation;
        a third port for a signal radiation at wavelength $\lambda s$; and
        a fourth port;
    wherein said coupling section is adapted to combine, in the fourth port, the signal radiation and the first and second pump radiation by means of a reversal of the direction of propagation of the first pump radiation from the first port to the fourth port.

2. Pumping unit according to claim 1, wherein the coupling section also comprises
    a first optical path which connects the first and the second port; and
    a second optical path, in communication with the first optical path, which connects the third and the fourth port,
    and it is adapted to send to the fourth port the first pump radiation, which propagates along the first optical path from the first port to the second port, making it pass from the first optical path to the second optical path and reflecting it back towards the fourth port.

3. Pumping unit according to claim 2, wherein the coupling section is also adapted to send to the fourth port the second pump radiation, which propagates along the first optical path from the second port towards the first port, making it pass from the first optical path to the second optical path.

4. Pumping unit according to claim 2, wherein the coupling section is also adapted to let the signal radiation propagate along the second optical path.

5. Pumping unit according to claim 1, wherein said coupling section comprises an optical reflection element adapted to reflect the first pump radiation at wavelength $\lambda p1$ towards the fourth port, and to let the second pump radiation at wavelength $\lambda p2$ and the signal radiation at wavelength $\lambda s$ pass.

6. Optical pumping unit according to claim 5, wherein said optical reflection element is a Bragg grating.

7. Optical pumping unit according to claim 2, wherein the first optical path comprises a waveguide.

8. Optical pumping unit according to claim 7, wherein the second optical path comprises a waveguide.

9. Optical pumping unit according to claim 8, wherein the first and the second optical path are coupled along a coupling area.

10. Optical pumping unit according to claim 9, wherein the coupling area is such as to let substantially all the power of the signal radiation at wavelength $\lambda s$ propagate along the second optical path, and to let substantially all the power of the first pump radiation at wavelength $\lambda p1$ and substantially all the power of the second pump radiation at wavelength $\lambda p2$ pass from the first optical path to the second optical path.

11. Optical pumping unit according to claim 10, wherein the first and the second optical path form a WDM optical coupler of the $100\%\lambda p1,\lambda p2/0\%\lambda s$ type, comprising two waveguides coupled with one another in said coupling area.

12. Optical pumping unit according to claim 10, wherein said coupling section comprises an optical reflection element positioned in the coupling area of the first and the second optical path, adapted to reflect the first pump radiation at wavelength $\lambda p1$ towards the fourth port and to let the second pump radiation at $\lambda p2$ and the signal radiation at wavelength $\lambda s$ pass.

13. Optical pumping unit according to claim 12 wherein said optical reflection element is a Bragg grating.

14. Optical pumping unit according to claim 12, wherein said optical reflection element is positioned in a point of the coupling area at which about 50% of power of the first pump radiation passes from the first optical path to the second optical path.

15. Optical pumping unit according to claim 9, wherein the first and the second optical path are also coupled along a second coupling area.

16. Optical pumping unit according to claim 15, wherein the first and the second optical path comprise an input coupler, an output coupler, an upper arm and a lower arm, and wherein the input coupler has four ports of which two are the second and the third port of the coupling section, and two are in communication with the upper arm and the lower arm, and the output coupler has four ports of which two are the first and the fourth port of the coupling section, and two are in communication with the upper arm and the lower arm.

17. Optical pumping unit according to claim 5, wherein the coupling section also comprises a second optical reflection element adapted to reflect the first pump radiation at wavelength $\lambda p1$ towards the fourth port, and to let the second pump radiation at wavelength $\lambda p2$ and the signal radiation at wavelength $\lambda s$ pass.

18. Optical pumping unit according to claim 17, wherein the first and the second optical path comprise an input coupler, an output coupler, an upper arm and a lower arm, and wherein the input coupler has four ports of which two are the second and the third port of the coupling section, and two are in communication with the upper arm and the lower arm, and the output coupler has four ports of which two are the first and the fourth port of the coupling section, and two are in communication with the upper arm and the lower arm, and wherein the first optical reflection element is positioned in said upper arm and the second optical reflection element is positioned in said lower arm.

19. Optical pumping unit according to claim 18, wherein the input coupler and the output coupler are two WDM optical couplers of the 50%λp1, λp2/0%λs type, each comprising two waveguides coupled with one another in said first and said second coupling area.

20. Optical amplifier for amplifying a signal radiation at wavelength λs comprising a dielectric guiding active means and a pumping unit according to claim 1, wherein the fourth port of the coupling section is in communication with the active means.

21. Optical communication line comprising a transmission optical fibre length and a pumping unit according to claim 1, wherein the fourth port of the coupling section is in communication with said transmission optical fibre length.

22. Optical communication line comprising a transmission optical fibre length and an optical amplifier according to claim 18 in communication with said transmission optical fibre length.

23. Optical communication system comprising
- a transmitting station adapted to provide a signal radiation having wavelength λs;
- an optical transmission line, optically connected to said transmitting station, for transmitting said signal radiation;
- a receiving station, optically connected to said optical transmission line, for receiving said signal radiation;
- at least one pumping unit according to claim 1, in communication with said optical transmission line.

24. Optical communication system comprising
- a transmitting station adapted to provide a signal radiation having wavelength λs;
- an optical transmission line, optically connected to said transmitting station, for transmitting said signal radiation;
- a receiving station, optically connected to said optical transmission line, for receiving said signal radiation;
- at least one optical amplifier according to claim 18 in communication with said optical transmission line.

25. An optical coupling section, for coupling a signal radiation at wavelength λs, a first pump radiation at wavelength λp1 and a second pump radiation at wavelength λp2, comprising
- a first and a second port for receiving respectively the first and the second pump radiation;
- a third port for the signal radiation; and
- a fourth port,
  and being adapted to combine the signal radiation and the first and second pump radiation in the fourth port through a reversal of the direction of propagation of the first pump radiation from the first port to the fourth port.

26. Method for coupling a first radiation at wavelength λp1, a second radiation at wavelength λp2 and a third radiation at wavelength λs through a common coupling section having a first and a second side that are opposed to one another, the first side comprising a first and a fourth port and the second side comprising a second and a third port, said method comprising the steps of
- a) propagating the second radiation from the second port to the first port;
- b) deviating the path of the second radiation so as to send it to the fourth port;
- c) sending the third signal radiation from the third port to the fourth port, or vice versa, from the fourth port to the third port;
- d) propagating the first radiation from the first port to the second port; and
- e) reversing the direction of propagation of the first radiation to send it to the fourth port.

27. Method according to claim 26, wherein the common coupling section also comprises a first optical path connecting the first and the second port, and a second optical path, in communication with the first optical path, connecting the third and the fourth port.

28. Method according to claim 27, wherein step a) is carried out by sending the second radiation along the first optical path from the second port to the first port.

29. Method according to claim 28, wherein step b) is carried out by making the second radiation pass from the first optical path to the second optical path.

30. Method according to claim 25, wherein step c) is carried out by letting the third radiation propagate along the second optical path.

31. Method according to claim 30, wherein step d) is carried out by sending the first radiation along the first optical path from the first port to the second port.

32. Method according to claim 31, wherein step e) is carried out by making the first radiation pass from the first optical path to the second optical path and back-reflecting it towards the fourth port.

* * * * *